United States Patent
Goodman et al.

(10) Patent No.: US 11,016,795 B2
(45) Date of Patent: May 25, 2021

(54) SYSTEM AND METHOD FOR VIRTUALIZING HOT-SWAPPABLE PCIE DEVICES FOR VIRTUAL MACHINES

(71) Applicant: EMC IP Holding Company, LLC, Hopkinton, MA (US)

(72) Inventors: Bradley K. Goodman, Nashua, NH (US); Thomas N. Dibb, Rutland, MA (US)

(73) Assignee: EMC IP Holding Company, LLC, Hopkinton, MA (US)

(*) Notice: Subject to any disclaimer, the term of this patent is extended or adjusted under 35 U.S.C. 154(b) by 115 days.

(21) Appl. No.: 16/263,121

(22) Filed: Jan. 31, 2019

(65) Prior Publication Data
US 2020/0249971 A1 Aug. 6, 2020

(51) Int. Cl.
*G06F 9/455* (2018.01)
*G06F 13/40* (2006.01)

(52) U.S. Cl.
CPC ...... *G06F 9/45558* (2013.01); *G06F 13/4022* (2013.01); *G06F 13/4081* (2013.01); *G06F 2009/45595* (2013.01); *G06F 2213/0026* (2013.01); *G06F 2213/0058* (2013.01); *G06F 2213/3808* (2013.01)

(58) Field of Classification Search
CPC ............ G06F 9/45558; G06F 13/4022; G06F 13/4081; G06F 2009/45595; G06F 2213/0026; G06F 2213/0058; G06F 2213/3808
See application file for complete search history.

(56) References Cited

U.S. PATENT DOCUMENTS

| | | | |
|---|---|---|---|
| 2008/0244146 A1* | 10/2008 | Das | G06F 13/4247 710/309 |
| 2011/0069710 A1* | 3/2011 | Naven | H04L 47/62 370/395.3 |
| 2013/0155083 A1* | 6/2013 | McKenzie | G06T 1/20 345/522 |

OTHER PUBLICATIONS

Markussen et al. Flexible Device Sharing in PCIe Clusters using Device Lending. [online] ACM., pp. 1-10. Retrieved From the Internet <https://dl.acm.org/doi/pdf/10.1145/3229710.3229759> (Year: 2018).*

* cited by examiner

*Primary Examiner* — Emerson C Puente
*Assistant Examiner* — Jonathan R Labud
(74) *Attorney, Agent, or Firm* — Brian J. Colandreo; Mark H. Whittenberger; Holland & Knight LLP

(57) ABSTRACT

A method, computer program product, and computing system for establishing a connection between a virtualization device and a virtual machine infrastructure. The virtualization device may be configured to be communicatively coupled to one or more PCIe devices. A virtual machine may be executed on the virtual machine infrastructure. Control of the virtualization device may be passed through the virtual machine infrastructure to the virtual machine.

19 Claims, 5 Drawing Sheets

SYSTEM AND METHOD FOR VIRTUALIZING HOT-SWAPPABLE PCIE DEVICES FOR VIRTUAL MACHINES

BACKGROUND

Storing and safeguarding electronic content may be beneficial in modern business and elsewhere. Accordingly, various methodologies may be employed to protect and distribute such electronic content. For example, virtualization systems may be utilized to provide users with access to virtual machines that are custom tailored to the needs and desires of the user.

In many virtualization systems, physical devices can be assigned to a specific virtual machine. This is generally called "pass-through" where the physical device is not controlled by a hypervisor but the virtual machine has raw access to it. This allows virtual machines to have very fast access to the physical device. For example, hypervisor-based storage or network services which may add large amounts of latency. However, in conventional virtualization systems, physical devices must be present at the time a virtual machine is initialized in order to work. Furthermore, many virtualized environments have no provision for dealing with the removal (spontaneous or otherwise) of devices. This means that devices must be present for the virtual machine to work, and devices cannot be removed during operation of the virtual machine. Further, virtual machines generally require an orderly shutdown, reconfiguration and restart of virtual machines before using newly added devices. As such, there are no current working methods to allow pass-through of PCIe devices into virtual machines in which devices may come and go at runtime.

SUMMARY OF DISCLOSURE

In one example implementation, a computer-implemented method executed on a computing device may include but is not limited to establishing, via the computing device, a connection between a virtualization device and a virtual machine infrastructure. The virtualization device may be configured to be communicatively coupled to one or more PCIe devices. A virtual machine may be executed on the virtual machine infrastructure. Control of the virtualization device may be passed through the virtual machine infrastructure to the virtual machine.

One or more of the following example features may be included. Passing control of the virtualization device through the virtual machine infrastructure to the virtual machine may include enabling the virtual machine to access the one or more PCIe devices communicatively coupled to the virtualization device. The virtual machine may be configured to operate when no PCIe devices are communicatively coupled to the virtualization device. The configuration of the one or more PCIe devices communicatively coupled to the virtualization device may be modified during runtime of the virtual machine. Modifying the configuration of the one or more PCIe devices communicatively coupled to the virtualization device during runtime of the virtual machine may include adding at least one PCIe device during runtime of the virtual machine. Modifying the configuration of the one or more PCIe devices communicatively coupled to the virtualization device during runtime of the virtual machine may include removing at least one PCIe device during runtime of the virtual machine. Passing control of the virtualization device through the virtual machine infrastructure to the virtual machine may include preventing an error from the one or more PCIe devices communicatively coupled to the virtualization device from being received by the virtual machine infrastructure. Passing control of the virtualization device through the virtual machine infrastructure to the virtual machine may include preventing the one or more PCIe devices communicatively coupled to the virtualization device from being accessible to the virtual machine infrastructure. A number of PCIe devices communicatively coupled to the virtualization device may be greater than a virtual machine infrastructure-imposed limit on a number of pass through devices associated with the virtual machine infrastructure.

In another example implementation, a computer program product resides on a computer readable medium that has a plurality of instructions stored on it. When executed by a processor, the instructions cause the processor to perform operations that may include but are not limited to establishing a connection between a virtualization device and a virtual machine infrastructure. The virtualization device may be configured to be communicatively coupled to one or more PCIe devices. A virtual machine may be executed on the virtual machine infrastructure. Control of the virtualization device may be passed through the virtual machine infrastructure to the virtual machine.

One or more of the following example features may be included. Passing control of the virtualization device through the virtual machine infrastructure to the virtual machine may include enabling the virtual machine to access the one or more PCIe devices communicatively coupled to the virtualization device. The virtual machine may be configured to operate when no PCIe devices are communicatively coupled to the virtualization device. The configuration of the one or more PCIe devices communicatively coupled to the virtualization device may be modified during runtime of the virtual machine. Modifying the configuration of the one or more PCIe devices communicatively coupled to the virtualization device during runtime of the virtual machine may include adding at least one PCIe device during runtime of the virtual machine. Modifying the configuration of the one or more PCIe devices communicatively coupled to the virtualization device during runtime of the virtual machine may include removing at least one PCIe device during runtime of the virtual machine. Passing control of the virtualization device through the virtual machine infrastructure to the virtual machine may include preventing an error from the one or more PCIe devices communicatively coupled to the virtualization device from being received by the virtual machine infrastructure. Passing control of the virtualization device through the virtual machine infrastructure to the virtual machine may include preventing the one or more PCIe devices communicatively coupled to the virtualization device from being accessible to the virtual machine infrastructure. A number of PCIe devices communicatively coupled to the virtualization device may be greater than a virtual machine infrastructure-imposed limit on a number of pass through devices associated with the virtual machine infrastructure.

In another example implementation, a computing system includes at least one processor and at least one memory architecture coupled with the at least one processor, wherein the computing system is configured to perform operations that may include but are not limited to establishing a connection between a virtualization device and a virtual machine infrastructure. The virtualization device may be configured to be communicatively coupled to one or more PCIe devices. A virtual machine may be executed on the virtual machine infrastructure. Control of the virtualization device may be passed through the virtual machine infrastructure to the virtual machine.

One or more of the following example features may be included. Passing control of the virtualization device through the virtual machine infrastructure to the virtual machine may include enabling the virtual machine to access the one or more PCIe devices communicatively coupled to the virtualization device. The virtual machine may be configured to operate when no PCIe devices are communicatively coupled to the virtualization device. The configuration of the one or more PCIe devices communicatively coupled to the virtualization device may be modified during runtime of the virtual machine. Modifying the configuration of the one or more PCIe devices communicatively coupled to the virtualization device during runtime of the virtual machine may include adding at least one PCIe device during runtime of the virtual machine. Modifying the configuration of the one or more PCIe devices communicatively coupled to the virtualization device during runtime of the virtual machine may include removing at least one PCIe device during runtime of the virtual machine. Passing control of the virtualization device through the virtual machine infrastructure to the virtual machine may include preventing an error from the one or more PCIe devices communicatively coupled to the virtualization device from being received by the virtual machine infrastructure. Passing control of the virtualization device through the virtual machine infrastructure to the virtual machine may include preventing the one or more PCIe devices communicatively coupled to the virtualization device from being accessible to the virtual machine infrastructure. A number of PCIe devices communicatively coupled to the virtualization device may be greater than a virtual machine infrastructure-imposed limit on a number of pass through devices associated with the virtual machine infrastructure.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

System Overview

Figure 1:
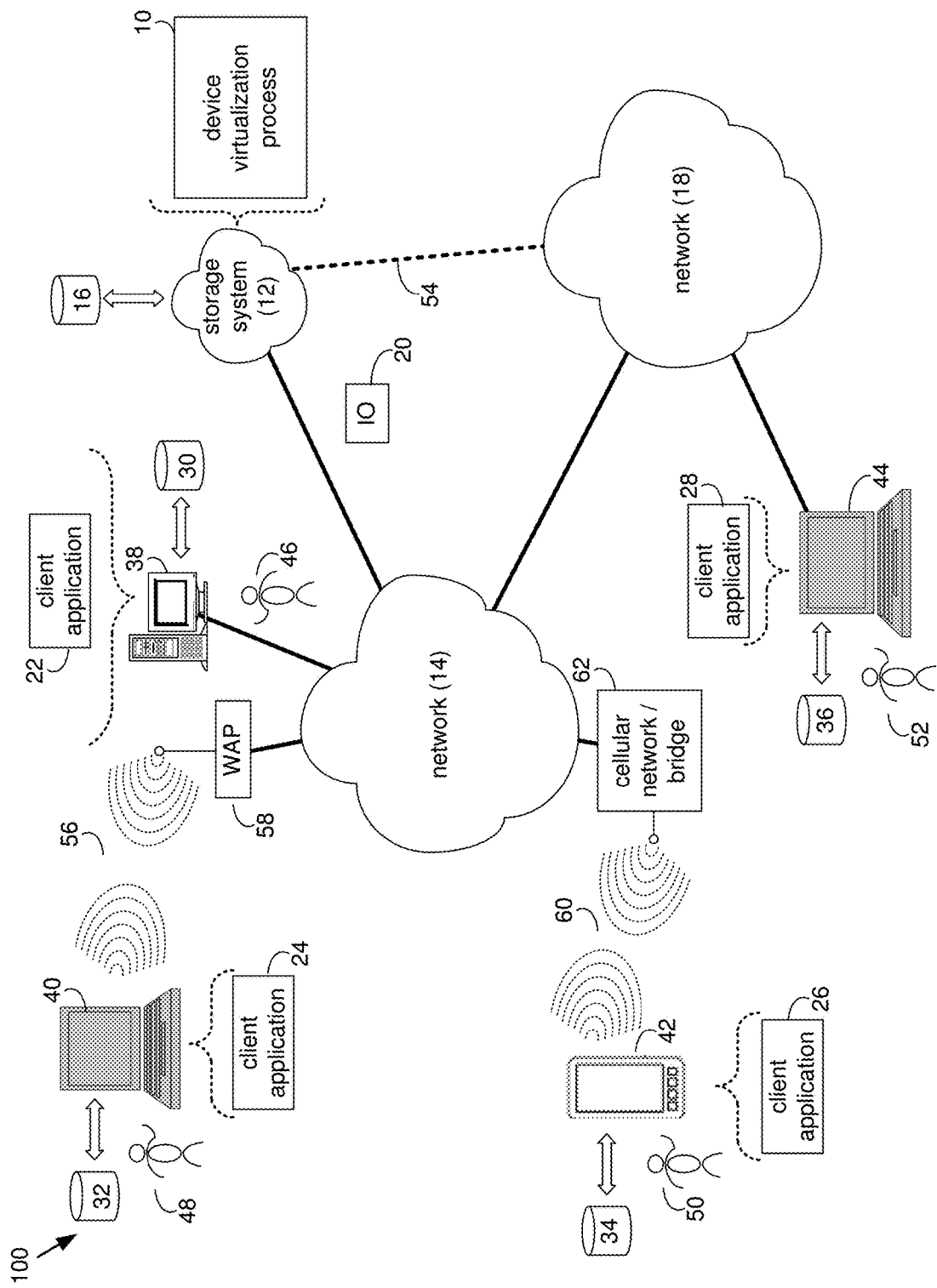
FIG. 1 is an example diagrammatic view of a storage system and a device virtualization process coupled to a distributed computing network according to one or more example implementations of the disclosure.

Referring to FIG. 1, there is shown device virtualization process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of device virtualization process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of device virtualization process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a cache management process, such as device virtualization process 10 of FIG. 1, may include but is not limited to, establishing a connection between a virtualization device and a virtual machine infrastructure. The virtualization device may be configured to be communicatively coupled to one or more PCIe devices. A virtual machine may be executed on the virtual machine infrastructure. Control of the virtualization device may be passed through the virtual machine infrastructure to the virtual machine.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
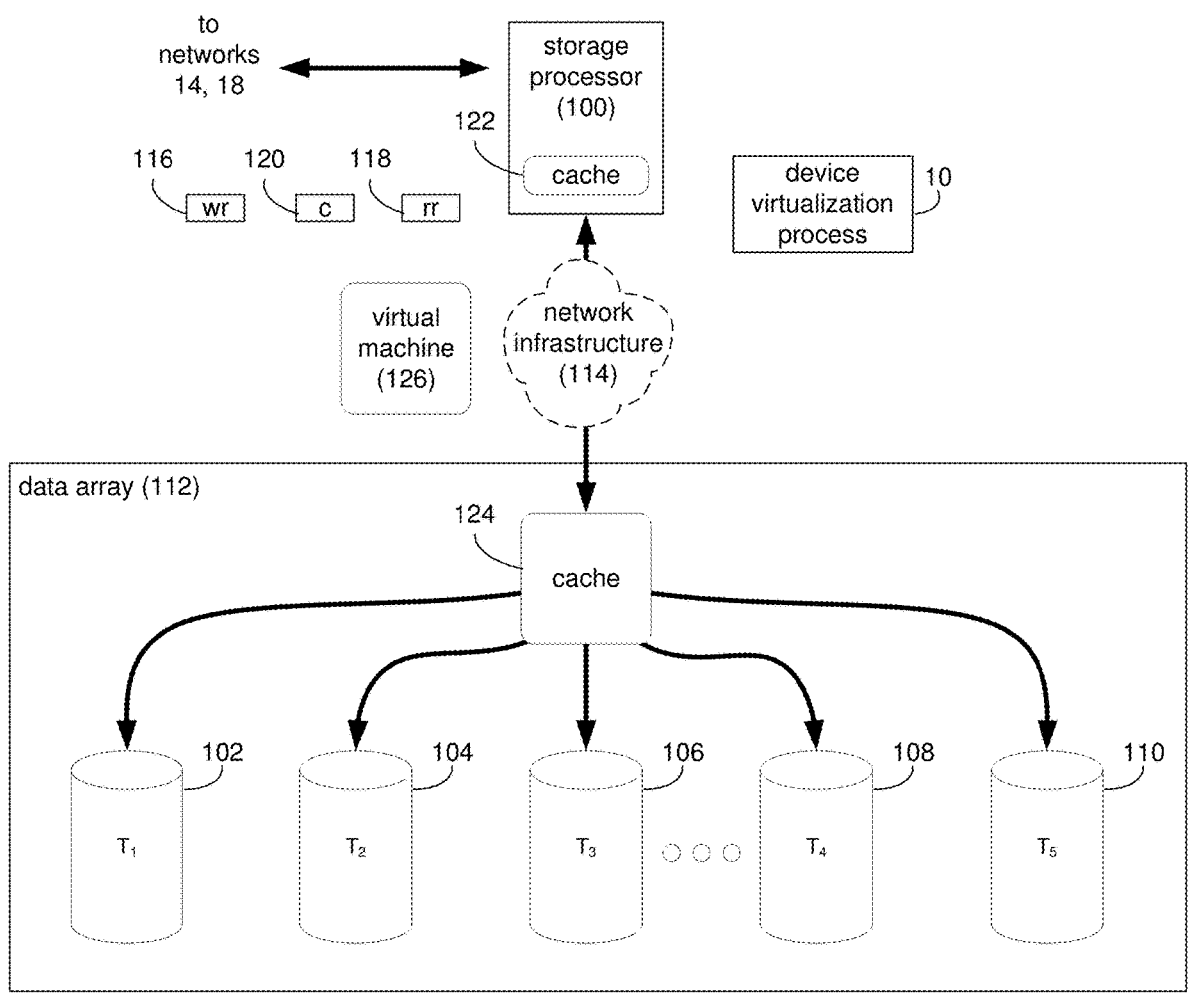
FIG. 2 is an example diagrammatic view of the storage system of FIG. 1 according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of device virtualization process 10. The instruction sets and subroutines of device virtualization process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of device virtualization process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of device virtualization process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of device virtualization process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Device Virtualization Process

Figure 3:
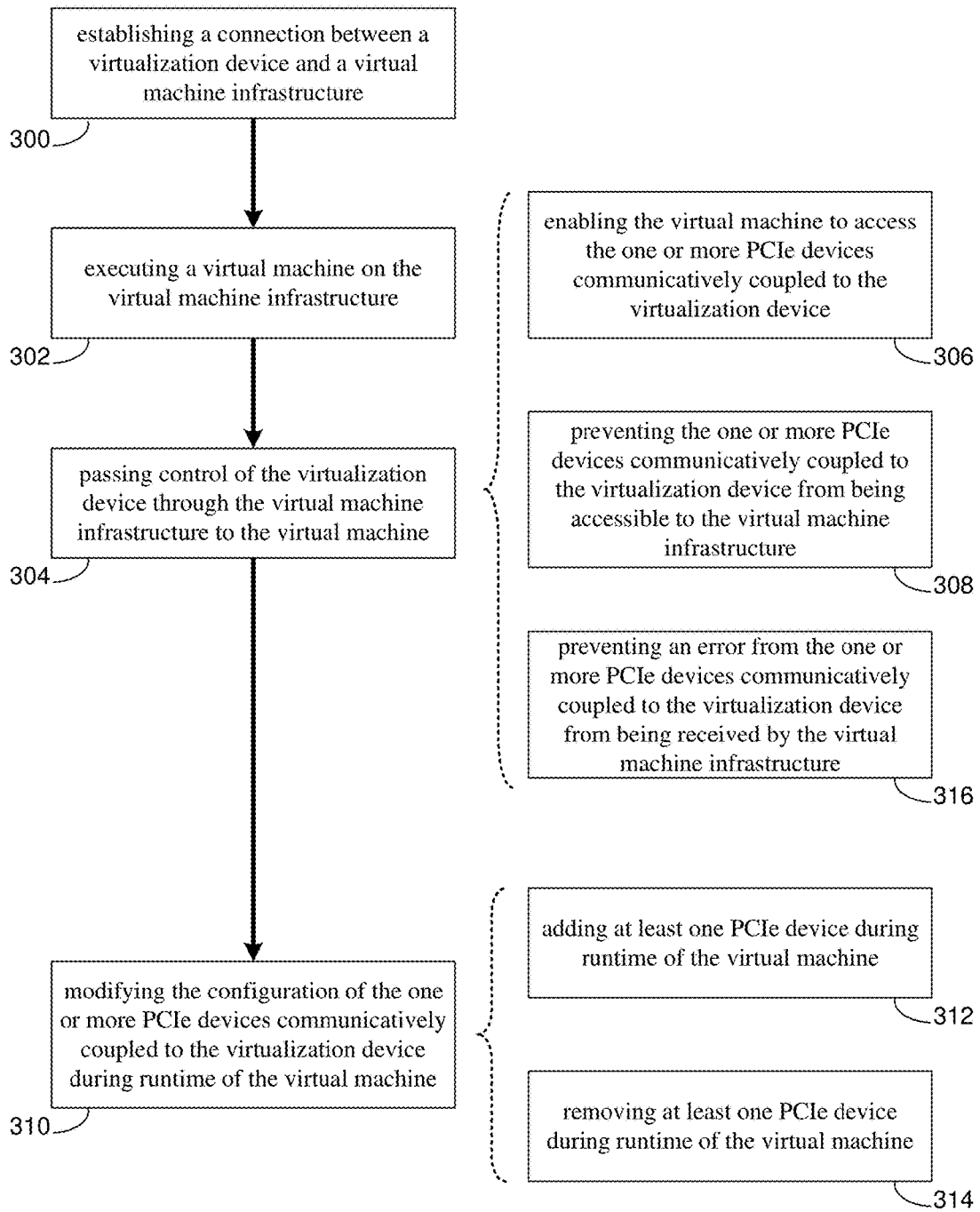
FIG. 3 is an example flowchart of the device virtualization process of FIG. 1 according to one or more example implementations of the disclosure.
Figure 4:
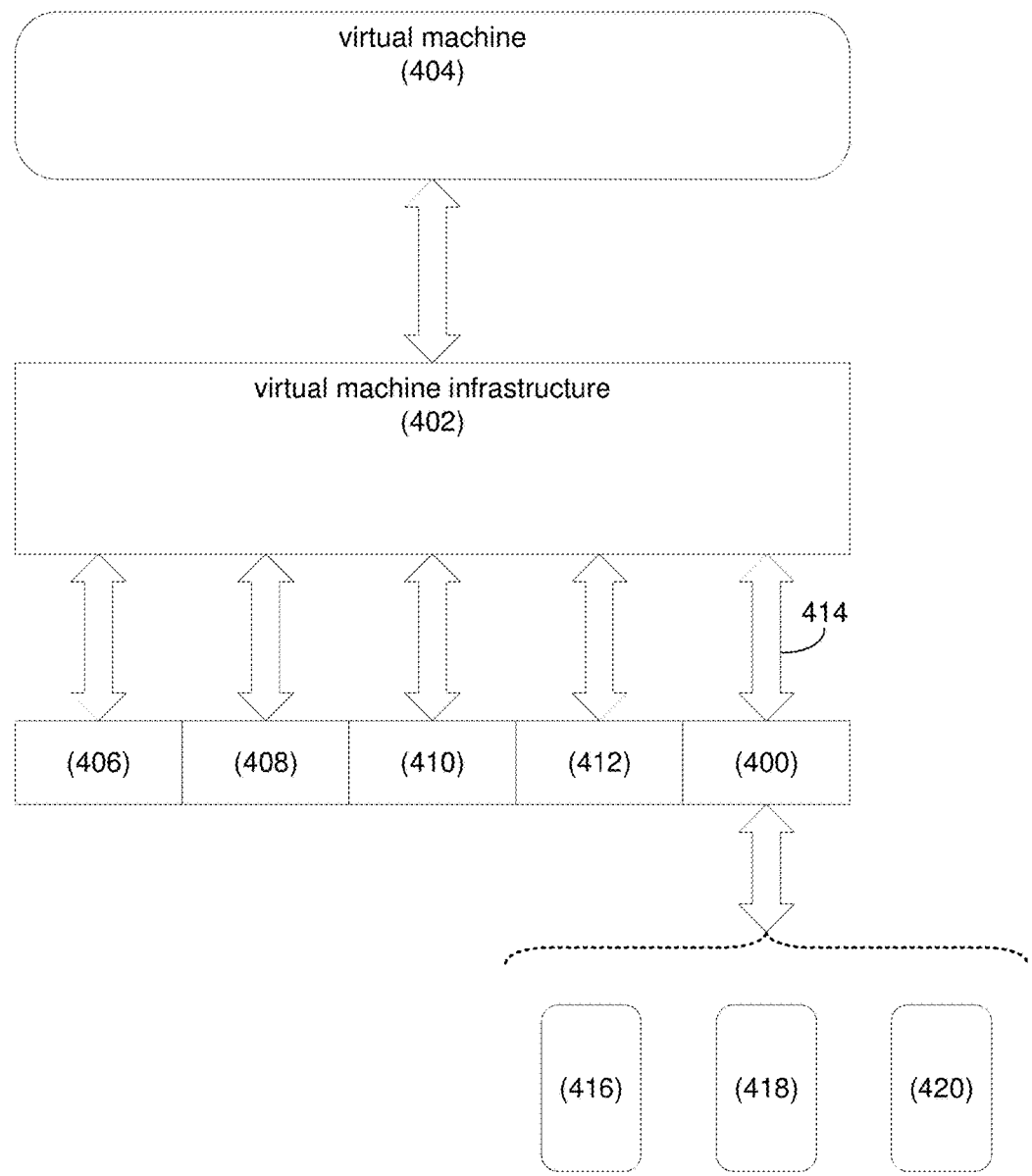
FIGS. 4-5 are example diagrammatic views of the storage system of FIG. 1 according to one or more example implementations of the disclosure; and Like reference symbols in the various drawings indicate like elements.
Figure 5:
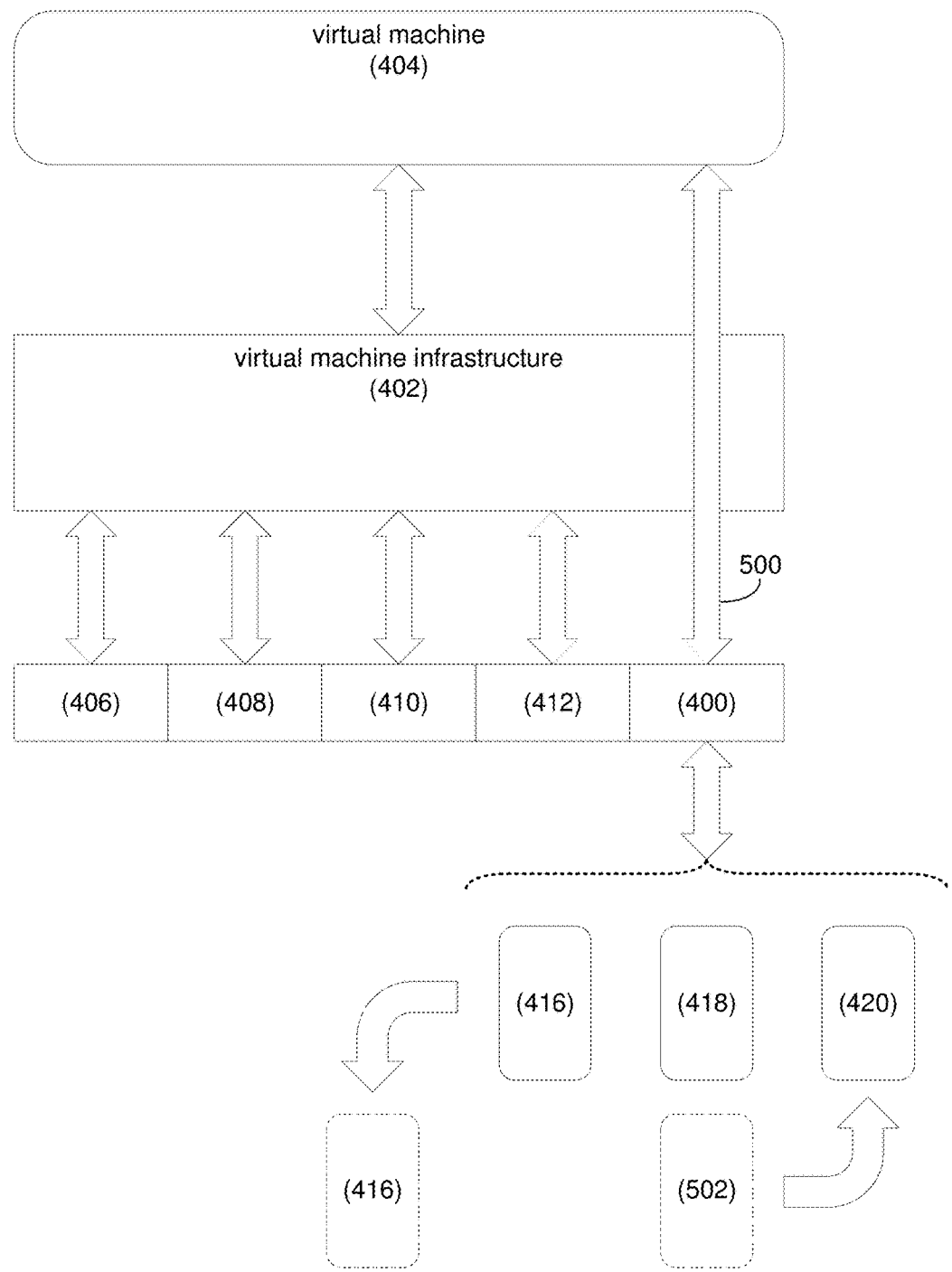

Referring also to FIGS. 3-5 and in some implementations, device virtualization process 10 may establish 300 a connection between a virtualization device and a virtual machine infrastructure. The virtualization device may be configured to be communicatively coupled to one or more PCIe devices. A virtual machine may be executed 302 on the virtual machine infrastructure. Control of the virtualization device may be passed 304 through the virtual machine infrastructure to the virtual machine.

As will be discussed in greater detail below, in many virtualization systems, physical devices can be assigned to a specific virtual machine. This is generally called "pass-through" where the physical device is not controlled by a hypervisor but the virtual machine has raw access to it. For example, a virtual machine is given direct access to the physical device by allowing the virtual machine to access the physical device's registers and memory space directly, without the need to go through infrastructure-based software layers, traps, or by other indirect or interceding means. This allows virtual machines to have very fast access to the physical device. For example, hypervisor-based storage or network services which may add large amounts of latency. However, in conventional virtualization systems, physical devices must be present at the time a virtual machine is initialized in order to work. Furthermore, many virtualized environments have no provision for dealing with the removal (spontaneous or otherwise) of devices. This means that devices must be present for the virtual machine to work, and devices cannot be removed during operation of the virtual machine. Further, virtual machines generally require an orderly shutdown, reconfiguration and restart of virtual machines before using newly added devices. As such, there are no current working methods to allow pass-through of PCIe devices into virtual machines in which devices may come and go at runtime. Embodiments of the present disclosure may allow PCIe devices communicatively coupled to a virtualization device to be modified, added, and/or removed during runtime of a virtual machine without stopping or restarting the virtual machine. In other words, the one or more PCIe devices communicatively coupled to the virtualization device that is passed through the virtual machine infrastructure to the virtual machine may allow the PCIe devices to be "hot-swappable" for virtual machines.

In some implementations, a virtualization device (e.g., virtualization device 400) may generally include computer software, hardware, and/or firmware that abstracts one or more physical devices communicatively coupled to the virtualization device. An example of a virtualization device may generally include an Intel® Volume Management Device developed by Intel Corporation of Santa Clara, Calif. However, the virtualization device may generally include any PCIe host bridge, a non-transparent bridge, an FPGA, or other combination of hardware, software, and/or firmware configured to abstract communicatively coupled devices.

Examples of physical devices that may be communicatively coupled to the virtualization device may generally include a Peripheral Component Interconnect Express (PCIe) device, a Non-Volatile Memory Express (NVMe) device, a Ethernet Network Interface Card (NIC), a PCIe switch, a Host Bus Adapter (HBA), or other physical device configured to be communicatively coupled to a virtual machine infrastructure and used in virtualization systems or environments. In some implementations, the one or more PCIe devices may include removable PCIe devices or modules that may be added to and/or removed from a storage system at any time (e.g., during runtime, before runtime, or after runtime). As will be discussed in greater detail below, embodiments of the present disclosure may allow a PCIe device to be physically added to a storage system and/or removed from a storage system during runtime of a virtual machine without restarting the virtual machine.

As is known in the art, a virtual machine infrastructure (virtual machine infrastructure 402) may generally include a hypervisor, a virtual machine manager, a kernel or other computer software, hardware, and/or firmware that creates and runs virtual machines (e.g., virtual machine 404). The virtual machine infrastructure (e.g., virtual machine infrastructure 402) may present a guest operating system with a virtual operating platform and may manage the execution of the guest operating system. Examples of virtual machine infrastructure may generally include Microsoft™ Hyper-V, VMware™ ESXi, Xen Project, Kernel-based Virtual Machine (KVM), QEMU, OpenStack™, etc. Additionally, multiple instantiations of a variety of operating systems may share virtualized hardware resources. For example, Linux™, Windows™, and Mac™ instantiations may all run on a single physical x86 system.

For this illustrative embodiment, virtual machine infrastructure 402 may be a portion of storage system 12. However, virtual machine infrastructure may be configured on various other types of systems, such as personal computers, server computers, a series of server computers, or a mainframe computer.

In some implementations, a virtual machine infrastructure may include one or more physical hardware components (e.g., physical hardware components 406, 408, 410, 412) that may be configurable to form virtual machines (e.g., virtual machine 404). Examples of physical hardware components 406 may include but are not limited to: hard drives, RAID arrays, host bus adapters (HBAs), network controllers, processor cores, cache memory architectures, volatile memory architectures, and persistent memory architectures. Accordingly and when virtual machine 404 is executed 302 on virtual machine infrastructure 402, various portions of physical hardware components 406 may be assigned to/mapped to virtual machine 404.

Referring again to the example of FIG. 4 and in some implementations, device virtualization process 10 may establish 300 a connection (e.g., connection 414) between a virtualization device (e.g., virtualization device 400) and the virtual machine infrastructure (e.g., virtual machine infrastructure 402). In this example, virtualization device 400 may abstract one or more physical devices (e.g., PCIe devices 416, 418, 420) communicatively coupled to virtualization device 400 from virtual machine infrastructure 402. Examples of the PCIe devices 416, 418, 420, may include, but are not limited to, Host Bus Adapters (HBAs), Non-Volatile Memory Express (NVM), Ethernet Network Interface Cards (NICs), and other PCIe devices. While an example with three PCIe devices has been provided, it will be appreciated that any number of PCIe devices may be communicatively coupled to the virtualization device within the scope of the present disclosure.

In some implementations, device virtualization process 10 may execute 302 a virtual machine on the virtual machine infrastructure. For example, device virtualization process 10 may execute 302 a virtual machine (e.g., virtual machine 404) on a virtual machine infrastructure (e.g., virtual machine infrastructure 402). As is known in the art, a virtual machine (e.g., virtual machine 404) is an emulation of a physical computer system. Virtual machines (e.g., virtual machine 404) may be based on physical computer architectures and may provide the functionality of a physical computer system.

In some implementations, the virtual machine may be a virtual storage appliance, an example of which may include but is not limited to the Unity VSA™ system offered by the DELL EMC Corporation of Hopkinton, Mass. As is known in the art, a virtual storage appliance (VSA) is a storage controller that runs on a virtual machine to create shared storage without the need for physical hardware.

In some implementations, device virtualization process 10 may pass 304 control of the virtualization device through the virtual machine infrastructure to a virtual machine. In some implementations, passing 304 control of the virtualization device through the virtual machine infrastructure to the virtual machine may be in response to executing the virtual machine on the virtual machine infrastructure. As discussed above and in some implementations, virtualization systems may generally pass physical components from the virtual machine infrastructure to a virtual machine. This is called "Pass-through" or "device pass-through". However, conventional virtualization systems do not pass through a virtualization device configured to abstract one or more PCIe devices communicatively coupled to the virtualization device to a virtual machine.

In some implementations, passing 304 control of the virtualization device through the virtual machine infrastructure to the virtual machine may include enabling 306 the virtual machine to access the one or more PCIe devices communicatively coupled to the virtualization device. Referring again to the example of FIG. 5 and in some implementations, device virtualization process 10 may pass 304 control of the virtualization device (e.g., virtualization device 400) through the virtual machine infrastructure (e.g., virtual machine infrastructure 402) to a virtual machine (e.g., virtual machine 404). In this example, passing 304 control of the virtualization device (e.g., virtualization device 400) may include enabling 306 the virtual machine (e.g., virtual machine 404) to access the one or more PCIe devices (e.g., PCIe devices 408, 410, 412) communicatively coupled to the virtualization device. Further suppose, for example purposes only, that PCIe device 416 is a removable PCIe device (e.g., a Four-Port 16 Gb/s Fibre Channel I/O Module). In response to passing 304 control of virtualization device 400 from virtual machine infrastructure 402 to virtual machine 404, virtual machine 404 may access PCIe device 416. In some implementations, enabling 306 access to the one or more PCIe devices may include configuring, via the virtual machine, the configuration or operation of the one or more PCIe devices directly from the virtual machine.

In some implementations, passing 304 control of the virtualization device through the virtual machine infrastructure to the virtual machine may include preventing 308 the one or more PCIe devices communicatively coupled to the virtualization device from being accessible to the virtual machine infrastructure. For example and in some implementations, virtualization device 400 may abstract the one or more PCIe devices communicatively coupled to the virtualization device from being accessible to the virtual machine infrastructure. In this manner, passing control of the virtualization device may prevent 308 the one or more PCIe devices communicatively coupled to the virtualization device from being accessible to the virtual machine infrastructure while allowing these PCIe devices to be accessed 306 by the virtual machine. Referring again to the example of FIG. 5 and in some implementations, device virtualization process 10 may pass 304 control of the virtualization device (e.g., virtualization device 400) through the virtual machine infrastructure (e.g., virtual machine infrastructure 402) to the virtual machine (e.g., virtual machine 404) by establishing a connection (e.g., connection 500) directly from the virtualization device (e.g., virtualization device 400) to the virtual machine (e.g., virtual machine 404).

Accordingly, embodiments of the present disclosure may allow users to communicatively couple various PCIe devices to a virtualization device which may be passed 304, via device virtualization process 10, from the virtual machine infrastructure to the virtual machine. In some implementations, device virtualization process 10 may prevent 308 the virtual machine infrastructure from accessing these PCIe devices communicatively coupled to the virtualization device. In some implementations, preventing 308 the virtual machine infrastructure from accessing the communicatively coupled PCIe devices may prevent other virtual machines executed on the virtual machine infrastructure from accessing the one or more PCIe devices. In this manner, passing 304 control of the virtualized device from the virtual machine infrastructure to a virtual machine may provide a layer of security for physical PCIe devices physically present in a virtual machine infrastructure.

In some implementations, the virtual machine may be configured to operate when no PCIe devices are communicatively coupled to the virtualization device. For example, hypervisors in conventional virtualization systems generally require the presence of any devices it is configured to operate with to be present in order for a virtual machine to be executed on the hypervisor. In some implementations, device virtualization process 10 may establish 302 a connection between a virtualization device and the virtual machine infrastructure. Accordingly, device virtualization process 10 may hide/abstract underlying PCIe devices such that none of these PCIe devices need be present when the virtual machine starts to operate. In some implementations, device virtualization process 10 may require that at least one fixed virtualization device needs to be present (e.g., via the connection established between the virtual machine infrastructure and the virtualization device) for a virtual machine to be executed on the virtual machine infrastructure. In other words, device virtualization process 10 may require that the virtualization device is "fixed" or non-hot-swappable. Accordingly, the virtual machine may always start by having at least a fixed virtualization device present. In this manner, when at least one virtualization device is connected to the virtual machine infrastructure, a virtual machine infrastructure may execute a virtual machine even if underlying PCIe devices are not communicatively coupled to the virtualization device.

In some implementations, device virtualization process 10 may modify 310 the configuration of the one or more PCIe devices communicatively coupled to the virtualization device during runtime of the virtual machine. For example, in conventional virtualization systems or environments, virtual machines are generally given a fixed or static configuration, specifying which physical devices are to be passed to it. This is generally required in conventional virtualization systems from both a technical and logistical standpoint. However and as discussed above, device virtualization process 10 may utilize a virtualization device to abstract underlying PCIe devices. In this manner, the virtual machine may be operated without consideration for which underling PCIe devices will be used or passed through by the virtual machine infrastructure. In some implementations, the configuration of the one or more PCIe device communicatively coupled to the virtualization device need not be pre-determined and can change at runtime without affecting the virtual machine infrastructure.

In some implementations, storage appliances are often implemented within virtual machines and may benefit from passing devices directly through to them. However, in conventional virtualization systems, virtual machines would be forced to statically configure all back-end devices prior to virtual machine startup. This may be impractical or impossible when the configuration of the PCIe devices present may need to be modified due to real-world considerations like drive replacements, failed or non-functional drives, etc. that any other non-virtual array would need to handle.

In some implementations, modifying 310 the configuration of the one or more PCIe devices communicatively coupled to the virtualization device during runtime of the virtual machine may include adding 312 at least one PCIe device during runtime of the virtual machine. For example, conventional virtual environments have no provision to allow the insertion of pass-through devices, dynamically at runtime. In some implementations, device virtualization process 10 may modify 310 the configuration of the one or more PCIe devices communicatively coupled to the virtualization device during runtime may include adding 312 at least one PCIe device during runtime without knowledge or interference by the virtual machine infrastructure. As discussed above and in some implementations, virtual machines in conventional virtualization systems may benefit from having devices passed through directly through to them. However, conventional virtualization systems cannot have PCIe devices spontaneously added during runtime without restarting the virtual machine. In some implementations, device virtualization process 10 may modify 310 the configuration of the one or more PCIe devices communicatively coupled to the virtualization device during runtime by adding 312 at least one PCIe device during runtime without restarting the virtual machine.

Referring again to the example of FIG. 5 and in some implementations, device virtualization process 10 may modify 310 the configuration of the one or more PCIe devices (e.g., PCIe devices 416, 418, 420) communicatively coupled to the virtualization device (e.g., virtualization device 400) during runtime of the virtual machine (e.g., virtual machine 404) by adding 312 at least one PCIe device (e.g., PCIe device 502) during runtime of the virtual machine.

In some implementations, modifying 310 the configuration of the one or more PCIe devices communicatively coupled to the virtualization device during runtime of the virtual machine may include removing 314 at least one PCIe device during runtime of the virtual machine. As discussed above and in some implementations, storage appliances may be implemented within virtual machines in conventional virtualization systems, and may benefit from passing devices directly through to them. However, conventional virtualization systems cannot have PCIe devices spontaneously removed during runtime without restarting the virtual machine. In some implementations, device virtualization process 10 may modify 310 the configuration of the one or more PCIe devices communicatively coupled to the virtualization device during runtime by removing 314 at least one PCIe device during runtime without restarting the virtual machine.

Referring again to the example of FIG. 5 and in some implementations, device virtualization process 10 may modify 310 the configuration of the one or more PCIe devices (e.g., PCIe devices 416, 418, 420) communicatively coupled to the virtualization device (e.g., virtualization device 400) during runtime of the virtual machine (e.g., virtual machine 404) by removing 314 at least one PCIe device (e.g., PCIe device 416) during runtime of the virtual machine.

In some implementations, passing 304 control of the virtualization device through the virtual machine infrastructure to the virtual machine may include preventing 316 an error from the one or more PCIe devices communicatively coupled to the virtualization device from being received by the virtual machine infrastructure. For example, problems in PCI or PCIe operation can cause errors to be generated. When these are detected by the hardware (e.g., a PCI Root Port), the virtual machine infrastructure or platform firmware may be alerted to it (e.g., via an interrupt, message, etc.). Either way, the virtual machine infrastructure may become aware of the issue. Often times, virtual machine infrastructure s see these as critical issues and may crash, reboot, and/or reset one or more virtual machines. However, in some implementations, some errors (e.g., PCI links going bad, devices disappearing, etc.) may be acceptable during operation of a virtual machine. As such, device virtualization process 10 may prevent 316 an error from the one or more PCIe devices communicatively coupled to the virtualization device from being propagated to, or made visible to the virtual machine infrastructure. Accordingly, the virtual machine infrastructure may not reset the virtual machine because of what it may perceive as a "critical" hardware error.

In some implementations, a number of PCIe devices communicatively coupled to the virtualization device may be greater than a virtual machine infrastructure-imposed limit on a number of pass through devices associated with the virtual machine infrastructure. For example, conventional virtualization systems that may allow pass-through of some physical devices to a virtual machine may have a pass through limit associated with the virtual machine infrastructure. In one example, a virtual machine infrastructure of a conventional virtualization system may limit a virtual machine to e.g., 16 physical devices being passed through. To avoid this issue, device virtualization process 10 may hide or abstract the one or more PCIe devices behind a single virtualization device. As such, the virtual machine infrastructure with a limit of e.g., 16 physical devices being passed through to a virtual machine, may be exceeded by communicatively coupling multiple PCIe devices to each of the e.g., 16 virtualization devices passed through to the virtual machine to increase the number of PCIe devices to a number greater than a virtual machine infrastructure-imposed limit on a number of pass through devices associated with the virtual machine infrastructure for a virtual machine. While an example pass through limit has been discussed, it will be appreciated that any virtual machine infrastructure-imposed limit on a number of pass through devices associated with a virtual machine infrastructure may be exceeded within the scope of the present disclosure.

In some implementations, device virtualization process 10 may allow passing through of other devices which may not follow the strict pass-through requirements of a host virtual machine infrastructure. For example, suppose there are some devices which virtual machine infrastructure 402 wants to claim and operate on our behalf with some ill-effects. Device virtualization process 10 may abstract or hide the one or more PCIe devices that the virtual machine infrastructure wants to claim and operate from the virtual machine infrastructure. Accordingly, implementations of device virtualization process 10 may allow a virtual machine to control or operate the one or more PCIe devices without the virtual machine infrastructure knowing or having access to the one or more PCIe devices.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    establishing, via the computing device, a connection between a virtualization device and a virtual machine infrastructure, wherein the virtualization device is configured to be communicatively coupled to one or more PCIe devices that are configured to be one or more of hidden and abstracted behind the virtualization device;
    executing a virtual machine on the virtual machine infrastructure; and
    passing control of the virtualization device through the virtual machine infrastructure to the virtual machine, wherein passing control of the virtualization device through the virtual machine infrastructure to the virtual machine is configured to render the one or more PCIe devices communicatively coupled to the virtualization device inaccessible to the virtual machine infrastructure.

2. The computer-implemented method of claim 1, wherein passing control of the virtualization device through the virtual machine infrastructure to the virtual machine includes enabling the virtual machine to access the one or more PCIe devices communicatively coupled to the virtualization device.

3. The computer-implemented method of claim 1, wherein the virtual machine is configured to operate when no PCIe devices are communicatively coupled to the virtualization device.

4. The computer-implemented method of claim 1, further comprising:
    modifying the configuration of the one or more PCIe devices communicatively coupled to the virtualization device during runtime of the virtual machine.

5. The computer implemented method of claim 4, wherein modifying the configuration of the one or more PCIe devices communicatively coupled to the virtualization device during runtime of the virtual machine includes adding at least one PCIe device during runtime of the virtual machine.

6. The computer implemented method of claim 4, wherein modifying the configuration of the one or more PCIe devices communicatively coupled to the virtualization device during runtime of the virtual machine includes removing at least one PCIe device during runtime of the virtual machine.

7. The computer implemented method of claim 1, wherein passing control of the virtualization device through the virtual machine infrastructure to the virtual machine includes preventing an error from the one or more PCIe devices communicatively coupled to the virtualization device from being received by the virtual machine infrastructure.

8. The computer implemented method of claim 1, wherein a number of PCIe devices communicatively coupled to the virtualization device is greater than a virtual machine infrastructure-imposed limit on a number of pass through devices associated with the virtual machine infrastructure.

9. A computer program product residing on a non-transitory computer readable medium having a plurality of instructions stored thereon which, when executed by a processor, cause the processor to perform operations comprising:
establishing, via the computing device, a connection between a virtualization device and a virtual machine infrastructure, wherein the virtualization device is configured to be communicatively coupled to one or more PCIe devices that are configured to be one or more of hidden and abstracted behind the virtualization device;
executing a virtual machine on the virtual machine infrastructure; and
passing control of the virtualization device through the virtual machine infrastructure to the virtual machine, wherein passing control of the virtualization device through the virtual machine infrastructure to the virtual machine is configured to render the one or more PCIe devices communicatively coupled to the virtualization device inaccessible to the virtual machine infrastructure.

10. The computer program product of claim 9, wherein passing control of the virtualization device through the virtual machine infrastructure to the virtual machine includes enabling the virtual machine to access the one or more PCIe devices communicatively coupled to the virtualization device.

11. The computer program product of claim 9, wherein the virtual machine is configured to operate when no PCIe devices are communicatively coupled to the virtualization device.

12. The computer program product of claim 9, further comprising:
modifying the configuration of the one or more PCIe devices communicatively coupled to the virtualization device during runtime of the virtual machine.

13. The computer program product of claim 12, wherein modifying the configuration of the one or more PCIe devices communicatively coupled to the virtualization device during runtime of the virtual machine includes adding at least one PCIe device during runtime of the virtual machine.

14. The computer program product of claim 12, wherein modifying the configuration of the one or more PCIe devices communicatively coupled to the virtualization device during runtime of the virtual machine includes removing at least one PCIe device during runtime of the virtual machine.

15. The computer program product of claim 9, wherein passing control of the virtualization device through the virtual machine infrastructure to the virtual machine includes preventing an error from the one or more PCIe devices communicatively coupled to the virtualization device from being received by the virtual machine infrastructure.

16. The computer program product of claim 9, wherein a number of PCIe devices communicatively coupled to the virtualization device is greater than a virtual machine infrastructure-imposed limit on a number of pass through devices associated with the virtual machine infrastructure.

17. A computing system including a processor and memory configured to perform operations comprising:
establishing, via the computing device, a connection between a virtualization device and a virtual machine infrastructure, wherein the virtualization device is configured to be communicatively coupled to one or more PCIe devices that are configured to be one or more of hidden and abstracted behind the virtualization device;
executing a virtual machine on the virtual machine infrastructure; and
passing control of the virtualization device through the virtual machine infrastructure to the virtual machine, wherein passing control of the virtualization device through the virtual machine infrastructure to the virtual machine is configured to render the one or more PCIe devices communicatively coupled to the virtualization device inaccessible to the virtual machine infrastructure.

18. The computing system of claim 17, wherein passing control of the virtualization device through the virtual machine infrastructure to the virtual machine includes enabling the virtual machine to access the one or more PCIe devices communicatively coupled to the virtualization device.

19. The computing system of claim 17, wherein the virtual machine is configured to operate when no PCIe devices are communicatively coupled to the virtualization device.

* * * * *